(12) United States Patent
Kawahito

(10) Patent No.: US 12,106,115 B2
(45) Date of Patent: Oct. 1, 2024

(54) SEARCHING AN ARRAY OF MULTI-BYTE ELEMENTS USING AN N-BYTE SEARCH INSTRUCTION

(71) Applicant: International Business Machines Corporation, Armonk, NY (US)

(72) Inventor: Motohiro Kawahito, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 86 days.

(21) Appl. No.: 18/102,050

(22) Filed: Jan. 26, 2023

(65) Prior Publication Data
US 2024/0256284 A1    Aug. 1, 2024

(51) Int. Cl.
G06F 9/30         (2018.01)
G06F 9/38         (2018.01)

(52) U.S. Cl.
CPC ........ G06F 9/3867 (2013.01); G06F 9/30021 (2013.01); G06F 9/30065 (2013.01); *G06F 9/30036* (2013.01)

(58) Field of Classification Search
CPC ............... G06F 9/3867; G06F 9/30021; G06F 9/30065; G06F 9/30036
See application file for complete search history.

(56) References Cited

U.S. PATENT DOCUMENTS

| | | | | |
|---|---|---|---|---|
| 6,341,346 B1* | 1/2002 | Benayoun | ........... | G06F 9/30021 |
| | | | | 712/E9.019 |
| 10,423,414 B2* | 9/2019 | Gupte | ................. | G06F 9/30036 |
| 2005/0216900 A1* | 9/2005 | Shi | ...................... | G06F 9/45516 |
| | | | | 717/161 |
| 2011/0115802 A1* | 5/2011 | Mantor | ................. | G06F 9/5061 |
| | | | | 345/520 |
| 2013/0262819 A1* | 10/2013 | Iyer | ....................... | G06F 9/3893 |
| | | | | 712/E9.023 |
| 2019/0171645 A1 | 6/2019 | Charles et al. | | |
| 2021/0232638 A1 | 7/2021 | Lichtenau et al. | | |
| 2022/0179652 A1* | 6/2022 | Bhardwaj | ........... | G06F 11/1048 |

FOREIGN PATENT DOCUMENTS

KR        102128581 B1    6/2020

OTHER PUBLICATIONS

Anonymous, "Loop Frequency Reduction Through Type-Based Operand Widening," IP.com, IP.com No. IPCOM000267285D, Oct. 13, 2021, pp. 1-12.

* cited by examiner

*Primary Examiner* — Corey S Faherty
(74) *Attorney, Agent, or Firm* — Shackelford, McKinley & Norton, LLP; Robert A. Voigt, Jr.

(57) ABSTRACT

A computer-implemented method, system and computer program product for effectively searching for values in a multi-byte array of elements using an n-byte search instruction. Multiple values to be searched in an N-byte array of elements in a loop are received. The loop is optimized by searching the received search values at the starting address of the N-byte array of elements using the n-byte search instruction. A successful search is performed if the received return address points to an address found in the lowest n-bytes of the N-byte array of elements and an element of the address corresponds to a search value. Otherwise, a subsequent search for the search values at the address of the next element in the N-byte array of elements is performed if there are additional elements in the N-byte array of elements to be searched.

20 Claims, 6 Drawing Sheets

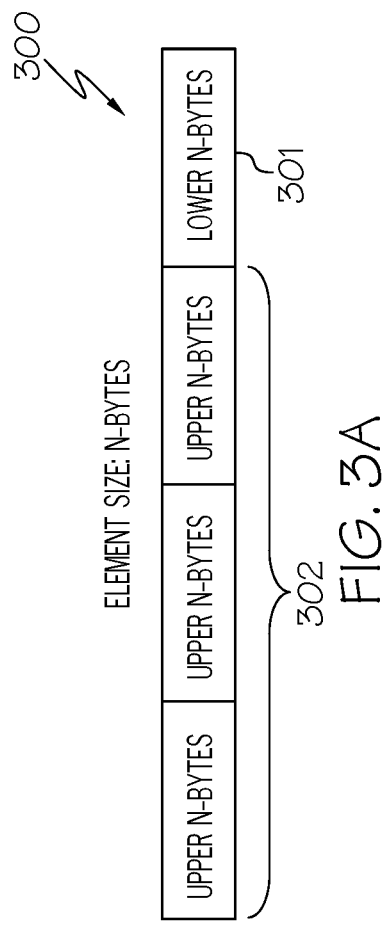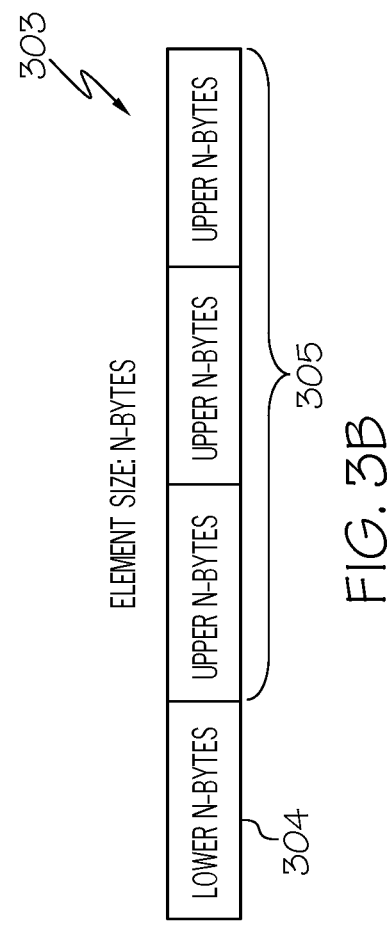

SEARCHING AN ARRAY OF MULTI-BYTE ELEMENTS USING AN N-BYTE SEARCH INSTRUCTION

TECHNICAL FIELD

The present disclosure relates generally to single-byte search instructions, and more particularly to searching an array of multi-byte elements or values using an n-byte search instruction, including a single-byte search instruction where n=1.

BACKGROUND

Many computer architectures utilize a single-byte search instruction to perform searches for an element or value in a single-byte array of elements or values. A "byte" is a unit of data that is eight binary digits long. A byte is the unit most computers use to represent a character, such as a letter, number or typographic symbol. For example, such a byte may represent an element or value to be searched in an array of elements or values. An "instruction" is an order given to a computer processor by a computer program. An "n-byte search instruction" refers to an instruction to perform a search in each n bytes from a given start address in a very fast manner. For example, a single-byte search instruction refers to an instruction to perform a search in each byte from a given start address in a very fast manner.

SUMMARY

In one embodiment of the present disclosure, a computer-implemented method for effectively searching for values in a multi-byte array of elements using an n-byte search instruction comprises receiving values to be searched in an N-byte array of elements in a loop of a program, where the N corresponds to n*constant, and where the n is an element size of a target search instruction. The method further comprises optimizing the loop of the program by searching for the received values at a starting address of the N-byte array of elements using the n-byte search instruction. The method additionally comprises receiving a return address in response to searching for the received values at the starting address of the N-byte array of elements using the n-byte search instruction. Furthermore, the method comprises identifying a search value of the received values in the N-byte array of elements in response to the return address pointing to an address found in a lowest n-bytes of the N-byte array of elements and an element of the address corresponds to the search value.

Other forms of the embodiment of the computer-implemented method described above are in a system and in a computer program product.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which:

FIGS. 3A and 3B illustrate the N-byte array of elements being stored in a big endian format and in a little endian format, respectively, in accordance with an embodiment of the present disclosure;

DETAILED DESCRIPTION

Figure 1:
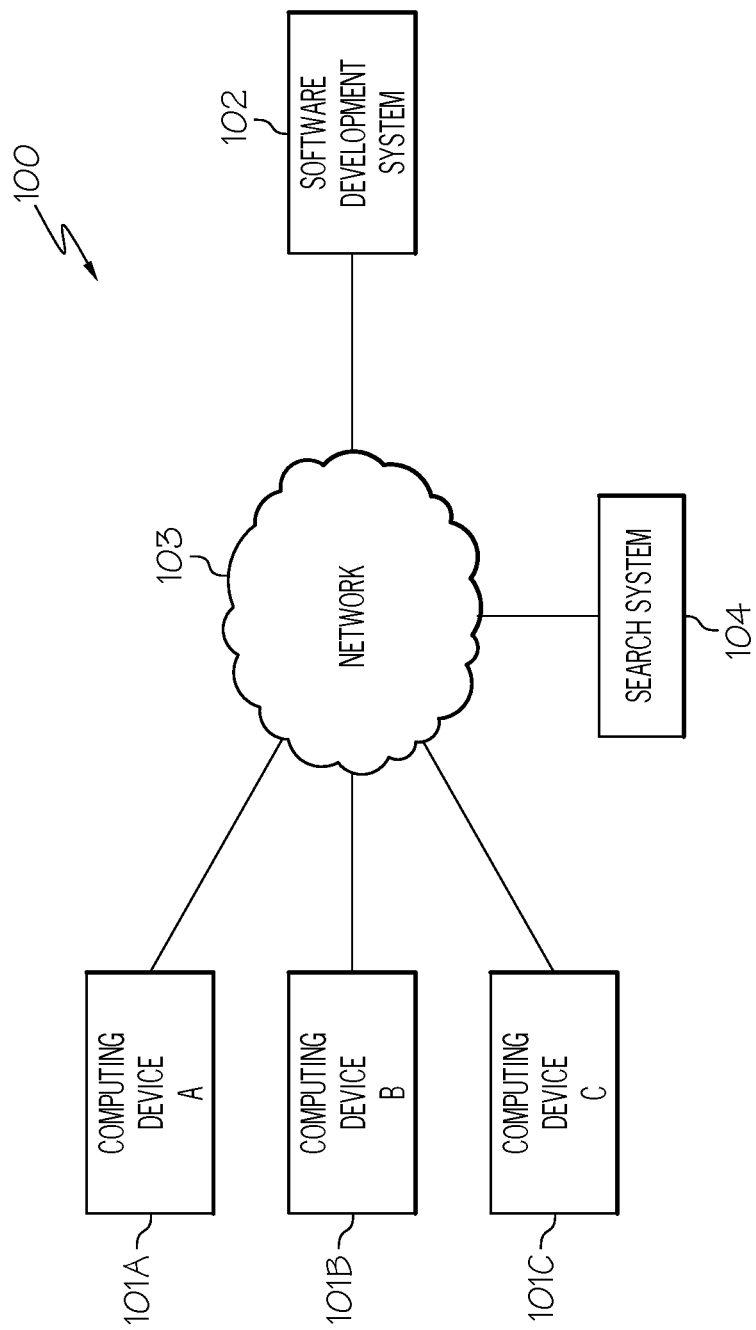
FIG. 1 illustrates a communication system for practicing the principles of the present disclosure in accordance with an embodiment of the present disclosure.

As stated above, many computer architectures utilize a single-byte search instruction to perform searches for an element or value in a single-byte array of elements or values. A "byte" is a unit of data that is eight binary digits long. A byte is the unit most computers use to represent a character, such as a letter, number or typographic symbol. For example, such a byte may represent an element or value to be searched in an array of elements or values. An "instruction" is an order given to a computer processor by a computer program. An "n-byte search instruction" refers to an instruction to perform a search in each n bytes from a given start address in a very fast manner. For example, a single-byte search instruction refers to an instruction to perform a search in each byte from a given start address in a very fast manner.

Currently, such single-byte search instructions are not able to be utilized to search for elements or values in a multi-byte array of elements or values. Instead, a slower search is performed to search for elements or values in a multi-byte array of elements or values, such as via the Single Instruction/Multiple Data (SIMD) instruction, which refers to a computing method that enables processing of multiple data with a single instruction. SIMD instructions give data-level parallelism on a unit (vector of data). A single instruction is executed in parallel on multiple data points as opposed to executing multiple instructions. This improves the performance of the application.

Currently, SIMD instructions may be used to search for elements or values in an array of 2, 4 or 8-byte elements or values. However, not all computer architectures support SIMD instructions, and therefore, are not able to search such an array of byte elements or values using the SIMD instruction.

Furthermore, SIMD instructions are not able to search for elements or values in an array of a certain number of byte elements, such as an array of 3-byte elements. As a result, a SIMD instruction may not be able to be utilized to search for elements or values in a particular multi-byte array of elements or values.

Additionally, if there are multiple values (search values) to be searched in a multi-byte array of byte elements, then using SIMD instructions may not be effective in performing such a search. For example, if value #1 and value #2 are to be searched in the multi-byte array of elements using a SIMD instruction, then separate searches using separate SIMD instructions need to be performed in which value #1 is first searched followed by searching for value #2 in the multi-byte array of elements.

Hence, using instructions, such as SIMD instructions, to search for elements or values in a multi-byte array of elements or values may not be an effective approach. If, however, a single-byte search instruction could be utilized to search for elements or values in a multi-byte array of elements or values, then the speed of the search process could be improved. Furthermore, by using a single-byte search instruction, elements or values may be searched in arrays with a different element size than currently supported by the SIMD instruction (e.g., SIMD instructions may be used to search for elements or values in an array of 2, 4 or 8-byte elements or values), such as an array of 3-byte elements. Additionally, by using a single-byte search instruction, separate searches may not need to be performed in searching for values in a multi-byte array of elements or values.

Unfortunately, there is not currently an effective means for utilizing a single-byte search instruction for performing a search, including a search for multiple values, in a multi-byte array of elements or values.

The embodiments of the present disclosure provide a means for utilizing an n-byte search instruction (where the element size is n-byte for the search instruction) for performing a searching, including a search for multiple values, in a multi-byte array of elements or values, such as in a loop of a program. In one embodiment, the loop of the program is optimized by searching for the received values ("search values") at the starting address of the N-byte array of elements in the loop of the program using an n-byte search instruction (where the element size is n-byte for the search instruction) which contains the values to be searched, where N corresponds to n*constant, and where n is the element size of the target search instruction. Upon executing the n-byte search instruction, a return address is received pointing to an address. If the return address points to an address in the lowest n-bytes of the N-byte array of elements and the element of the address corresponds to a search value, then a successful search is performed. Otherwise, a subsequent search at the address of the next element of the N-byte array of elements is performed if there are additional elements of the N-byte array of elements to be searched. If, however, there are no more additional elements in the N-byte array of elements to be searched (i.e., the return address points to an address at the end of the N-byte array of elements), then the search is deemed to be unsuccessful or a failure. A further discussion regarding these and other features is provided below.

In some embodiments of the present disclosure, the present disclosure comprises a computer-implemented method, system and computer program product for effectively searching for values in a multi-byte array of elements using an n-byte search instruction (where the element size is n-byte for the search instruction). In one embodiment of the present disclosure, multiple values to be searched ("search values") in an N-byte array of elements in a loop of a program are received, where N corresponds to n*constant, and where n is the element size of the target search instruction. In one embodiment, the search values are constant values at compile time. The loop of the program may then be optimized by searching for search values at the starting address of the N-byte array of elements using the n-byte search instruction. "Optimizing," as used herein, refers to being able to search for elements or values in a multi-byte array of elements or values using an n-byte search instruction, including a single-byte search instruction, such as a Search String (SRST) instruction or a Translate and Test (TRT) instruction. Optimizing involves including in the loop of the program with faster code that performs operations directed to searching for elements or values in a multi-byte array of elements or values using an n-byte search instruction. Upon performing such a search for search values, a return address is received. If the return address points to an address in the lowest n-bytes of the N-byte array of elements and its element value corresponds to a search value, then the search is deemed to be a "successful search." If, however, the return address does not point to an address in the lowest n-bytes of the N-byte array of elements where its element value corresponds to a search value, then a subsequent search for the search values at the address of the next element of the N-byte array of elements is performed if there are more elements to be searched in the N-byte array of elements. If, however, there are no more additional elements of the N-byte array of elements to be searched (i.e., the return address points to an address at the end of the N-byte array of elements), then the search is deemed to be unsuccessful or a failure. In this manner, an n-byte search instruction, including a single-byte search instruction, may be utilized to search for multiple values in a multi-byte array of elements.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill in the relevant art.

Referring now to the Figures in detail, FIG. 1 illustrates an embodiment of the present disclosure of a communication system 100 for practicing the principles of the present disclosure. Communication system 100 includes computing devices 101A-101C (identified as "Computing Device A," "Computing Device B," and "Computing Device C," respectively, in FIG. 1) connected to a software development system 102 via a network 103. Computing devices 101A-101C may collectively or individually be referred to as computing devices 101 or computing device 101, respectively.

Computing device 101 may be any type of computing device (e.g., portable computing unit, Personal Digital Assistant (PDA), laptop computer, mobile device, tablet personal computer, smartphone, mobile phone, navigation device, gaming unit, desktop computer system, workstation, Internet appliance and the like) configured with the capability of connecting to network 103 and consequently communicating with other computing devices 101 and software development system 102. It is noted that both computing device 101 and the user of computing device 101 may be identified with element number 101.

Software development system 102 is a system utilized, such as by software programmers and software developers (e.g., users of computing devices 101), in the process of creating, designing, deploying and supporting software. Examples of such software development systems, include, but not limited to, RAD Studio®, Embold®, Collaborator®, Studio 3T®, NetBeans®, Zend Studio®, Microsoft® Expression Studio, etc.

Network 103 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present disclosure.

System 100 further includes a search system 104 interconnected with computing devices 101 and software development system 102 via network 103. In one embodiment, search system 104 is configured to perform a search for multiple elements or values in an N-byte array of elements or values in a loop of a program using an n-byte search instruction (where the element size is n-byte for the search instruction) as discussed further below. It is noted that the term "element" and "value" may be used interchangeably herein. For example, an N-byte array of elements corresponds to an N-byte array of values, such as letters, numbers, typographical symbols, etc.

A description of the software components of search system 104 used for searching for multiple elements or values in an N-byte array of elements or values in a loop of a program using an n-byte search instruction, including a single-byte search instruction, is provided below in connection with FIG. 2. A description of the hardware configuration of search system 104 is provided further below in connection with FIG. 4.

System 100 is not to be limited in scope to any one particular network architecture. System 100 may include any number of computing devices 101, software development systems 102, networks 103 and search systems 104.

A discussion regarding the software components used by search system 104 to search for multiple elements or values in an N-byte array of elements or values in a loop of a program using an n-byte search instruction, including a single-byte search instruction, is provided below in connection with FIG. 2.

Figure 2:
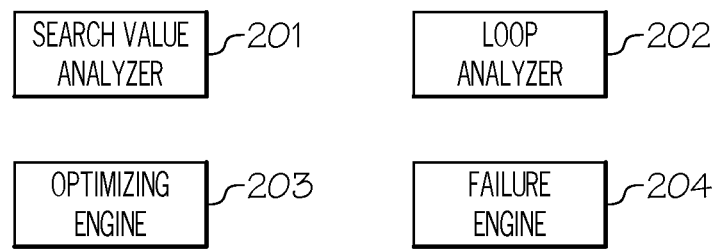
FIG. 2 is a diagram of the software components used by the search system to search for multiple elements or values in an N-byte array of elements or values in a loop of a program using an n-byte search instruction in accordance with an embodiment of the present disclosure.

FIG. 2 is a diagram of the software components used by search system 104 (FIG. 1) to search for multiple elements or values in an N-byte array of elements or values in a loop of a program using an n-byte search instruction, including a single-byte search instruction, in accordance with an embodiment of the present disclosure.

As shown in FIG. 2, search system 104 includes a search value analyzer 201 configured to receive multiple values to be searched ("search values") in the N-byte array of elements in a loop of a program. In one embodiment, such values to be searched are provided by an expert, such as a user of search system 104. In one embodiment, the search values are constant values at compile time.

Furthermore, search value analyzer 201 is configured to determine if there is an element of the upper n-bytes of the received search values in the lowest n-bytes of the received search values. The lowest n-bytes of the received search values is referred to herein as the "lower n-bytes" or "LOW." The remaining n-bytes of the received search values are referred to herein as the "upper n-bytes" or "HIGH." As a result, search value analyzer 201 determines if there is an element in HIGH that is also an element in LOW.

If there is an element in HIGH that is also an element in LOW, then search value analyzer 201 issues an instruction to not optimize the loop of the program. "Optimizing," as used herein, refers to being able to search for elements or values in a multi-byte array of elements or values using an n-byte search instruction, including a single-byte search instruction, such as a Search String (SRST) instruction or a Translate and Test (TRT) instruction. Optimizing involves including in the loop of the program with faster code that performs operations directed to searching for elements or values in a multi-byte array of elements or values using an n-byte search instruction. An instruction to not optimize the loop of the program may be issued by search value analyzer 201 so as to reduce the failure ratio, which is discussed further below. In situations in which there is an element of the search values in HIGH that is also in LOW, there is a greater chance of a failure (not being able to identify a search value in the N-byte array of elements). As a result, in such situations, optimization of the loop of the program may not be performed in order to reduce the failure rate. If, however, there is not an element in HIGH that is also an element in LOW (LOW n HIGH is empty), then optimization of the loop of the program is performed as discussed below.

Search system 104 further includes a loop analyzer 202 configured to determine the search length of a loop of a computer program (also simply referred to as a "program"). A loop, as used herein, refers to a sequence of instructions that is continually repeated until a certain condition is reached. In one embodiment, such a loop contains an array of N-byte elements or values, where N corresponds to n*constant, and where n is the element size of the target search instruction. In one embodiment, loop analyzer 202 determines the search length of the loop of the program by determining the search length of the array of N-byte elements or values in the loop of the program. In one embodiment, loop analyzer 202 determines the search length of the array of N-byte elements or values in the loop of the program by utilizing a value profiling technique, which collects runtime statistics of the search length which is used to obtain the search length (e.g., average search length) at runtime.

In one embodiment, loop analyzer 202 obtains the search length of the loop of the program by identifying the array length, such as via the array.length function.

In one embodiment, the search length of the array of N-byte elements or values is determined by loop analyzer 202 by identifying the number of elements in the array. In one embodiment, loop analyzer 202 utilizes the size of operator to determine the number of elements in the array.

In one embodiment, loop analyzer 202 determines if the search length of the loop of the program is less than a threshold value, which may be user-designated. If the search length of the loop of the program is less than a threshold value, then loop analyzer 202 issues an instruction to not optimize the loop of the program. By performing such an analysis, loop analyzer 202 may decide to not optimize the loop of the program in order to reduce the failure rate (discussed below). In situations in which the search length of the loop of the program is less than the threshold value, there is a greater chance of a failure (not being able to identify a search value in the N-byte array of elements). As a result, in such situations, optimization of the loop of the program may not be performed in order to reduce the failure rate.

If, however, the search length of the loop of the program is not less than the threshold value, then optimizing engine 203 of search system 104 optimizes the loop of the program. As previously discussed, search value analyzer 201 receives multiple values to be searched in the N-byte array of elements in the loop of the program. In one embodiment, such values to be searched are provided by an expert, such as a user of search system 104. In one embodiment, the search values are constant values at compile time.

In one embodiment, optimizing engine 203 optimizes the loop of the program by searching such received search values (values to be searched in the N-byte array of element) at the starting address of the N-byte array using an n-byte search instruction (e.g., a single-byte search instruction, such as the SRST instruction or TRT instruction).

In one embodiment, a computer architecture may implement either a little endian system or a big endian system. Endianness, as used herein, refers to the order or sequence of bytes of a word of digital data in computer memory. Endianness is primarily expressed as big endian (BE) or little endian (LE). A big endian system stores the most significant byte(s) of a word at the smallest memory address and the least significant byte(s) at the largest memory address as shown in FIG. 3A. A little endian system, in contrast, stores the least-significant byte(s) at the smallest memory address as shown in FIG. 3B.

FIGS. 3A and 3B illustrate the N-byte array of elements being stored in a big endian format and in a little endian format, respectively, in accordance with an embodiment of the present disclosure.

As shown in FIG. 3A, in the big endian format 300, the least-significant bytes 301 (lowest n-bytes of the N-byte array of elements) are stored at the largest memory address. The lowest n-bytes of the N-byte array of elements are referred to herein as the "lower n-bytes 301." The remaining n-bytes of the N-byte array of elements are referred to herein as the "upper n-bytes 302" as shown in FIG. 3A.

In contrast, as shown in FIG. 3B, in the little endian format 303, the least-significant bytes 304 (lowest n-bytes of the N-byte array of elements) are stored at the smallest memory address. The lowest n-bytes of the N-byte array of elements are referred to herein as the "lower n-bytes 304." The remaining n-bytes of the N-byte array of elements are referred to herein as the "upper n-bytes 305" as shown in FIG. 3B.

As discussed above, in one embodiment, the loop of the program is optimized by searching the received search values (values to be searched in the N-byte array of elements) at the starting address of the N-byte array of elements using an n-byte search instruction (e.g., single-byte search instruction, such as the SRST instruction or TRT instruction). For example, suppose that D1(B1) and D1(B2) are the addresses of the values to be searched in the N-byte array of elements. As a result, the format of a TRT instruction may look like:

TRT D1 (B1, B2), D2 (B3), where D1(B1, B2) are the addresses of the values to be searched, and D2(B3) is the address of the N-byte array of elements.

Upon searching for the search values (values received that are to be searched in the N-byte array of elements) in the N-byte array of elements using the n-byte search instruction, a return address is received.

If the return address points to the address in the lowest n-bytes (e.g., lower n-bytes 301, 304) of the N-byte array of elements, and the element of the address corresponds to a search value (one of the received values to be searched in the N-byte array of elements), then optimizing engine 203 identified the address of the element found (element of the address corresponds to a search value) as the result. Furthermore, optimizing engine 203 exits the loop of the program and quantifies such an identification as a "success." "Success," as used herein, refers to the ability of optimizing engine 203 to identify the address of the element found (element of the address corresponds to a search value) in the N-byte array of elements. Hence, a "success" results in identifying a search value in the N-byte array of elements.

If, however, the return address does not point to an address in the lowest n-bytes of the N-byte array of elements, where the element of the address corresponds to the search value, then optimizing engine 203 continues to search for the search values at the address of the next element in the N-byte array of elements if there are additional elements to be searched in the N-byte array of elements. If, however, there are no more additional elements to be searched in the N-byte array of elements (i.e., the return address points to the address at the end of the N-byte array of elements), then optimizing engine 203 exits the loop of the program and quantifies such an identification as a "failure." A "failure," as used herein, refers to optimizing engine 203 not being able to identify the search value in the N-byte array of elements for a particular search iteration.

In this manner, an n-byte search instruction, such as a single-byte search instruction, may be utilized to search for multiple values in a multi-byte array of elements.

An example pseudocode for implementing the functionality of optimizing engine 203 is shown below.

```
SADDRESS=beginning of array A
while (true) {
    RET=search values in LOW from SADDRESS by
        using the instruction S
    if (RET==End of array A) break; // cannot find
    if (RET points to lower && element of RET is one of
        V) {
        RET=beginning of the element address
        break; // found
    }
    SADDRESS=address of the next element
}
```

Referring to the above pseudocode, array A refers to the N-byte array of elements, where N corresponds to n*constant, and where n is the element size of the target search instruction. S corresponds to the n-byte search instruction, such as a single-byte search instruction, discussed above. Furthermore, V corresponds to the search values, which are constant values at compile time.

In another example, suppose the following loop of the program is to be optimized.

for (i=0; i<A.length; i++) // A is a 2-byte array
    if (A[i]==0x000A||A[i]==0x000D) break;
where V (set of values to be searched in N-byte array of elements)={0x000A, 0x000D}, LOW (lowest n-bytes of V)={0x0A, 0x0D}, HIGH (other n-bytes of V)={0x00}, and (LOW ∩ HIGH) is empty.

An example pseudocode for implementing the functionality of optimizing engine 203 using the single-byte search instruction of the TRT instruction to perform a single-byte search in a multi-value array is shown below. In one embodiment, such code is generated for the loop discussed above, such as in a compiler, for the big endian format.

```
SADDRESS=beginning of array A
while (true) {
    RET=search {0x0A, 0x0D} from SADDRESS by TRT
    if (RET==End of array A) break; // fail
```

```
    RET --;
    if ((RET & 1)==0) {
       if (load2Byte(RET)==0x000A or 0x000D))
          break; // found
       SADDRESS=RET+2;
    } else {
       SADDRESS=RET+3;
    }
}
i=(RET-beginning of array A)/2;
```

In one embodiment, a further example of pseudocode for implementing the functionality of optimizing engine 203 using the single-byte search instruction of the TRT instruction to perform a single-byte search in a multi-value array is shown below. In one embodiment, such code is generated for the loop discussed above, such as in a compiler, for the little endian format.

```
if (RET==End of array A) break; // fail
if ((RET & 1)==0) {
   if (load2Byte(RET)==0x000A or 0x000D))
      break; // found
   SADDRESS=RET+2;
} else {
   SADDRESS=RET+1;
}
```

Upon identifying the result of the search as being a "success" or a "failure," a "failure ratio" is identified by failure engine 204 of search system 104.

In one embodiment, the failure ratio corresponds to the ratio of failures to successes. In one embodiment, failure engine 204 computes the failure ratio as corresponding to the equation of: (failures)/(failures+successes). In one embodiment, after each search is performed, the number of failures or successes is updated to reflect whether the previous search was deemed to be a failure or a success.

In one embodiment, failure engine 204 compares the failure ratio to a threshold value, which may be user-designated. In one embodiment, if the failure ratio is greater than the threshold value, then failure engine 204 cancels the optimization of the loop of the program since the loop of the program is not being effectively optimized.

In one embodiment, failure engine 204 cancels the optimization of the loop of the program by code patching or recompilation. "Code patching," as used herein, refers to removing the code discussed above that was utilized to optimize the loop of the program. In this manner, the loop of the program will not be optimized.

"Recompilation," as used herein, refers to the action or process of recompiling the set of machine instructions again without the code discussed above that was utilized to optimize the loop of the program. In this manner, the loop of the program will not be optimized upon recompiling the program.

If, however, the failure ratio is not greater than the threshold value, then failure engine 204 does not cancel the optimization of the loop of the program.

An example pseudocode for computing successes and failures by failure engine 204 is shown below.

```
SADDRESS=beginning of array A
while (true) {
   RET=search values in LOW from SADDRESS by
      using the instruction S
   if (RET==End of array A) break; // cannot find
   if (RET points to lower && element of RET is one of
      V) {
      RET=beginning of the element address
      successes++;
      break; // found
   }
   failures++;
   SADDRESS=address of the next element
}
```

A further description of these and other features is provided below in connection with the discussion of the method for effectively searching for values in a multi-byte array of elements or values using an n-byte search instruction, such as a single-byte search instruction.

Prior to the discussion of the method for effectively searching for values in a multi-byte array of elements using an n-byte search instruction, such as a single-byte search instruction, a description of the hardware configuration of search system 104 (FIG. 1) is provided below in connection with FIG. 4.

Figure 4:
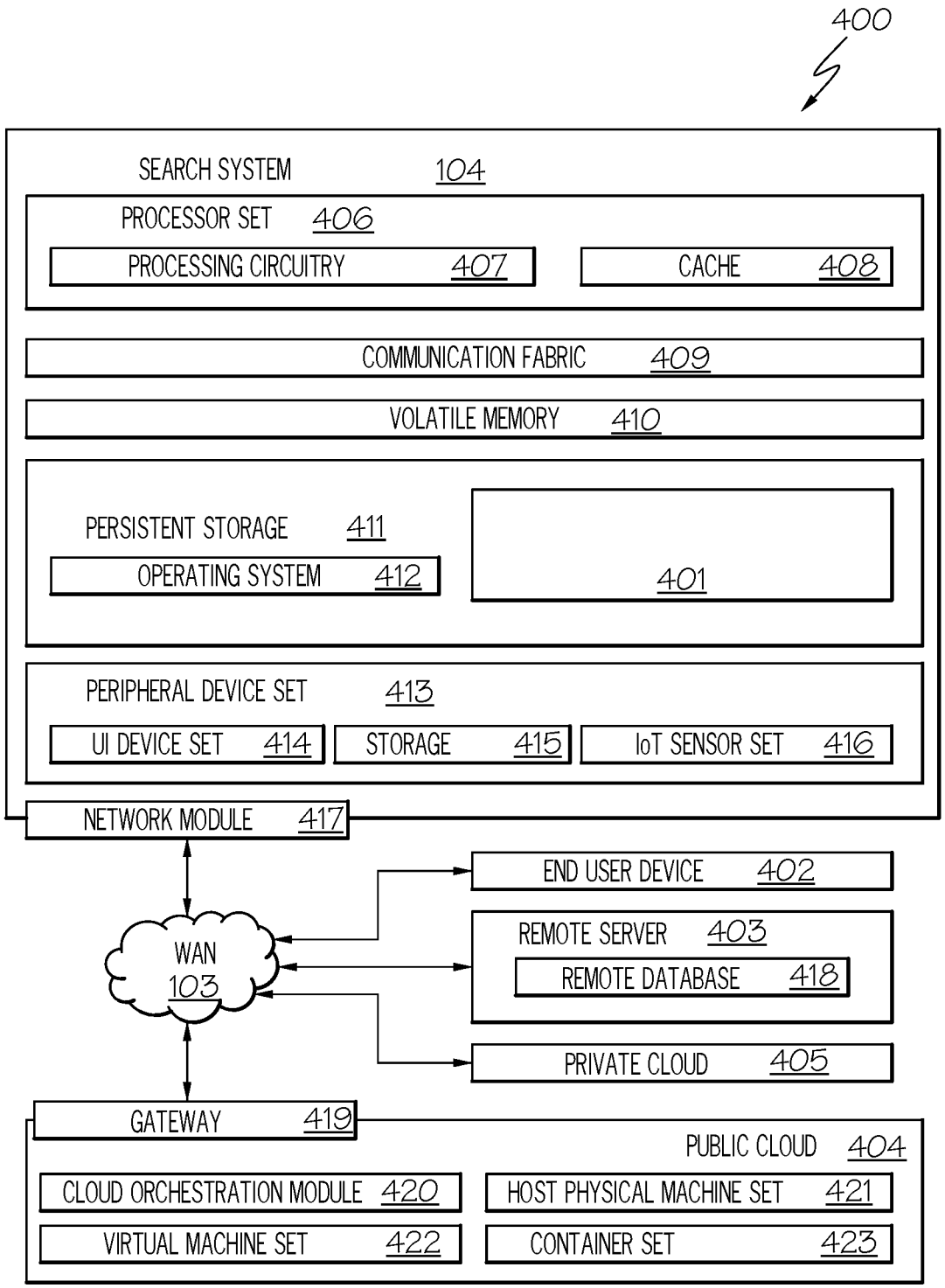
FIG. 4 illustrates an embodiment of the present disclosure of the hardware configuration of the search system which is representative of a hardware environment for practicing the present disclosure.

Referring now to FIG. 4, in conjunction with FIG. 1, FIG. 4 illustrates an embodiment of the present disclosure of the hardware configuration of search system 104 which is representative of a hardware environment for practicing the present disclosure.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 400 contains an example of an environment for the execution of at least some of the computer code (stored in block 401) involved in performing the inventive methods, such as effectively searching for values in a multi-byte array of elements or values using an n-byte search instruction (where the element size is n-byte for the search instruction), such as a single-byte search instruction. In addition to block 401, computing environment 400 includes, for example, search system 104, network 103, such as a wide area network (WAN), end user device (EUD) 402, remote server 403, public cloud 404, and private cloud 405. In this embodiment, search system 104 includes processor set 406 (including processing circuitry 407 and cache 408), communication fabric 409, volatile memory 410, persistent storage 411 (including operating system 412 and block 401, as identified above), peripheral device set 413 (including user interface (UI) device set 414, storage 415, and Internet of Things (IoT) sensor set 416), and network module 417. Remote server 403 includes remote database 418. Public cloud 404 includes gateway 419, cloud orchestration module 420, host physical machine set 421, virtual machine set 422, and container set 423.

Search system 104 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 418. As is well understood in the art of computer technology, and depending upon the technology, performance of a computer-implemented method may be distributed among multiple computers and/or between multiple locations. On the other hand, in this presentation of computing environment 400, detailed discussion is focused on a single computer, specifically search system 104, to keep the presentation as simple as possible. Search system 104 may be located in a cloud, even though it is not shown in a cloud in FIG. 4. On the other hand, search system 104 is not required to be in a cloud except to any extent as may be affirmatively indicated.

Processor set 406 includes one, or more, computer processors of any type now known or to be developed in the future. Processing circuitry 407 may be distributed over multiple packages, for example, multiple, coordinated integrated circuit chips. Processing circuitry 407 may implement multiple processor threads and/or multiple processor cores. Cache 408 is memory that is located in the processor chip package(s) and is typically used for data or code that should be available for rapid access by the threads or cores running on processor set 406. Cache memories are typically organized into multiple levels depending upon relative proximity to the processing circuitry. Alternatively, some, or all, of the cache for the processor set may be located "off chip." In some computing environments, processor set 406 may be designed for working with qubits and performing quantum computing.

Computer readable program instructions are typically loaded onto search system 104 to cause a series of operational steps to be performed by processor set 406 of search system 104 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 408 and the other storage media discussed below. The program instructions, and associated data, are accessed by processor set 406 to control and direct performance of the inventive methods. In computing environment 400, at least some of the instructions for performing the inventive methods may be stored in block 401 in persistent storage 411.

Communication fabric 409 is the signal conduction paths that allow the various components of search system 104 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 410 is any type of volatile memory now known or to be developed in the future. Examples include dynamic type random access memory (RAM) or static type RAM. Typically, the volatile memory is characterized by random access, but this is not required unless affirmatively indicated. In search system 104, the volatile memory 410 is located in a single package and is internal to search system 104, but, alternatively or additionally, the volatile memory may be distributed over multiple packages and/or located externally with respect to search system 104.

Persistent Storage 411 is any form of non-volatile storage for computers that is now known or to be developed in the future. The non-volatility of this storage means that the stored data is maintained regardless of whether power is being supplied to search system 104 and/or directly to persistent storage 411. Persistent storage 411 may be a read only memory (ROM), but typically at least a portion of the persistent storage allows writing of data, deletion of data and re-writing of data. Some familiar forms of persistent storage include magnetic disks and solid state storage devices. Operating system 412 may take several forms, such as various known proprietary operating systems or open source Portable Operating System Interface type operating systems that employ a kernel. The code included in block 401 typically includes at least some of the computer code involved in performing the inventive methods.

Peripheral device set 413 includes the set of peripheral devices of search system 104. Data communication connections between the peripheral devices and the other components of search system 104 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 414 may include components such as a display screen, speaker, microphone, wearable devices (such as goggles and smart watches), keyboard, mouse, printer, touchpad, game controllers, and haptic devices. Storage 415 is external storage, such as an external hard drive, or insertable storage, such as an SD card. Storage 415 may be persistent and/or volatile. In some embodiments, storage 415 may take the form of a quantum computing storage device for storing data in the form of qubits. In embodiments where search system 104 is required to have a large amount of storage (for example, where search system 104 locally stores and manages a large database) then this storage may be provided by peripheral storage devices designed for storing very large amounts of data, such as a storage area network (SAN) that is shared by multiple, geographically distributed computers. IoT sensor set 416 is made up of sensors that can be used in Internet of Things applications. For example, one sensor may be a thermometer and another sensor may be a motion detector.

Network module 417 is the collection of computer software, hardware, and firmware that allows search system 104 to communicate with other computers through WAN 103. Network module 417 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 417 are performed on the same physical hardware device. In other embodiments (for example, embodiments that utilize software-defined networking (SDN)), the control functions and the forwarding functions of network module 417 are performed on physically separate devices, such that the control functions manage several different network hardware devices. Computer readable program instructions for performing the inventive methods can typically be downloaded to search system 104 from an external computer or external storage device through a network adapter card or network interface included in network module 417.

WAN 103 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 402 is any computer system that is used and controlled by an end user (for example, a customer of an enterprise that operates search system 104), and may take any of the forms discussed above in connection with search system 104. EUD 402 typically receives helpful and useful data from the operations of search system 104. For example, in a hypothetical case where search system 104 is designed to provide a recommendation to an end user, this recommendation would typically be communicated from network module 417 of search system 104 through WAN 103 to EUD 402. In this way, EUD 402 can display, or otherwise present, the recommendation to an end user. In some embodiments, EUD 402 may be a client device, such as thin client, heavy client, mainframe computer, desktop computer and so on.

Remote server 403 is any computer system that serves at least some data and/or functionality to search system 104. Remote server 403 may be controlled and used by the same entity that operates search system 104. Remote server 403 represents the machine(s) that collect and store helpful and useful data for use by other computers, such as search system 104. For example, in a hypothetical case where search system 104 is designed and programmed to provide a recommendation based on historical data, then this historical data may be provided to search system 104 from remote database 418 of remote server 403.

Public cloud 404 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 404 is performed by the computer hardware and/or software of cloud orchestration module 420. The computing resources provided by public cloud 404 are typically implemented by virtual computing environments that run on various computers making up the computers of host physical machine set 421, which is the universe of physical computers in and/or available to public cloud 404. The virtual computing environments (VCEs) typically take the form of virtual machines from virtual machine set 422 and/or containers from container set 423. It is understood that these VCEs may be stored as images and may be transferred among and between the various physical machine hosts, either as images or after instantiation of the VCE. Cloud orchestration module 420 manages the transfer and storage of images, deploys new instantiations of VCEs and manages active instantiations of VCE deployments. Gateway 419 is the collection of computer software, hardware, and firmware that allows public cloud 404 to communicate through WAN 103.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 405 is similar to public cloud 404, except that the computing resources are only available for use by a single enterprise. While private cloud 405 is depicted as being in communication with WAN 103 in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 404 and private cloud 405 are both part of a larger hybrid cloud.

Block 401 further includes the software components discussed above in connection with FIGS. 2 and 3A-3B to effectively search for values in a multi-byte array of elements or values using an n-byte search instruction (where the element size is n-byte for the search instruction), such as a single-byte search instruction. In one embodiment, such components may be implemented in hardware. The functions discussed above performed by such components are not generic computer functions. As a result, search system 104 is a particular machine that is the result of implementing specific, non-generic computer functions.

In one embodiment, the functionality of such software components of search system 104, including the functionality for effectively searching for values in a multi-byte array of elements or values using an n-byte search instruction (where the element size is n-byte for the search instruction), such as a single-byte search instruction, may be embodied in an application specific integrated circuit.

As stated above, many computer architectures utilize a single-byte search instruction to perform searches for an element or value in a single-byte array of elements or values. A "byte" is a unit of data that is eight binary digits long. A byte is the unit most computers use to represent a character, such as a letter, number or typographic symbol. For example, such a byte may represent an element or value to be searched in an array of elements or values. An "instruction" is an order given to a computer processor by a computer program. A "single-byte search instruction" refers to an instruction to perform a search in each byte from a given start address in a very fast manner. Currently, such single-byte search instructions are not able to be utilized to search for elements or values in a multi-byte array of elements or values. Instead, a slower search is performed to search for elements or values in a multi-byte array of elements or values, such as via the Single Instruction/Multiple Data (SIMD) instruction, which refers to a computing method that enables processing of multiple data with a single instruction. SIMD instructions give data-level parallelism on a unit (vector of data). A single instruction is executed in parallel on multiple data points as opposed to executing multiple instructions. This improves the performance of the application. Currently, SIMD instructions may be used to search for elements or values in an array of 2, 4 or 8-byte elements or values. However, not all computer architectures support SIMD instructions, and therefore, are not able to search such an array of byte elements or values using the SIMD instruction. Furthermore, SIMD instructions are not able to search for elements or values in an array of a certain number of byte elements, such as an array of 3-byte elements. As a result, a SIMD instruction may not be able to be utilized to search for elements or values in a particular multi-byte array of elements or values. Additionally, if there are multiple values (search values) to be searched in a multi-byte array of byte elements, then using SIMD instructions may not be effective in performing such a search. For example, if value #1 and value #2 are to be searched in the multi-byte array of elements using a SIMD instruction, then separate searches using separate SIMD instructions need to be performed in which value #1 is first searched followed by searching for value #2 in the multi-byte array of elements. Hence, using instructions, such as SIMD instructions, to search for elements or values in a multi-byte array of elements or values may not be an effective approach. If, however, a single-byte search instruction could be utilized to search for elements or values in a multi-byte array of elements or values, then the speed of the search process could be improved. Furthermore, by using a single-byte search instruction, elements or values may be searched in arrays with a different element size than currently supported by the SIMD instruction (e.g., SIMD instructions may be used to search for elements or values in an array of 2, 4 or 8-byte elements or values), such as an array of 3-byte elements. Additionally, by using a single-byte search instruction, separate searches may not need to be performed in searching for values in a multi-byte array of elements or values. Unfortunately, there is not currently an effective means for utilizing a single-byte search instruction for performing a search, including a search for multiple values, in a multi-byte array of elements or values.

Figure 5:
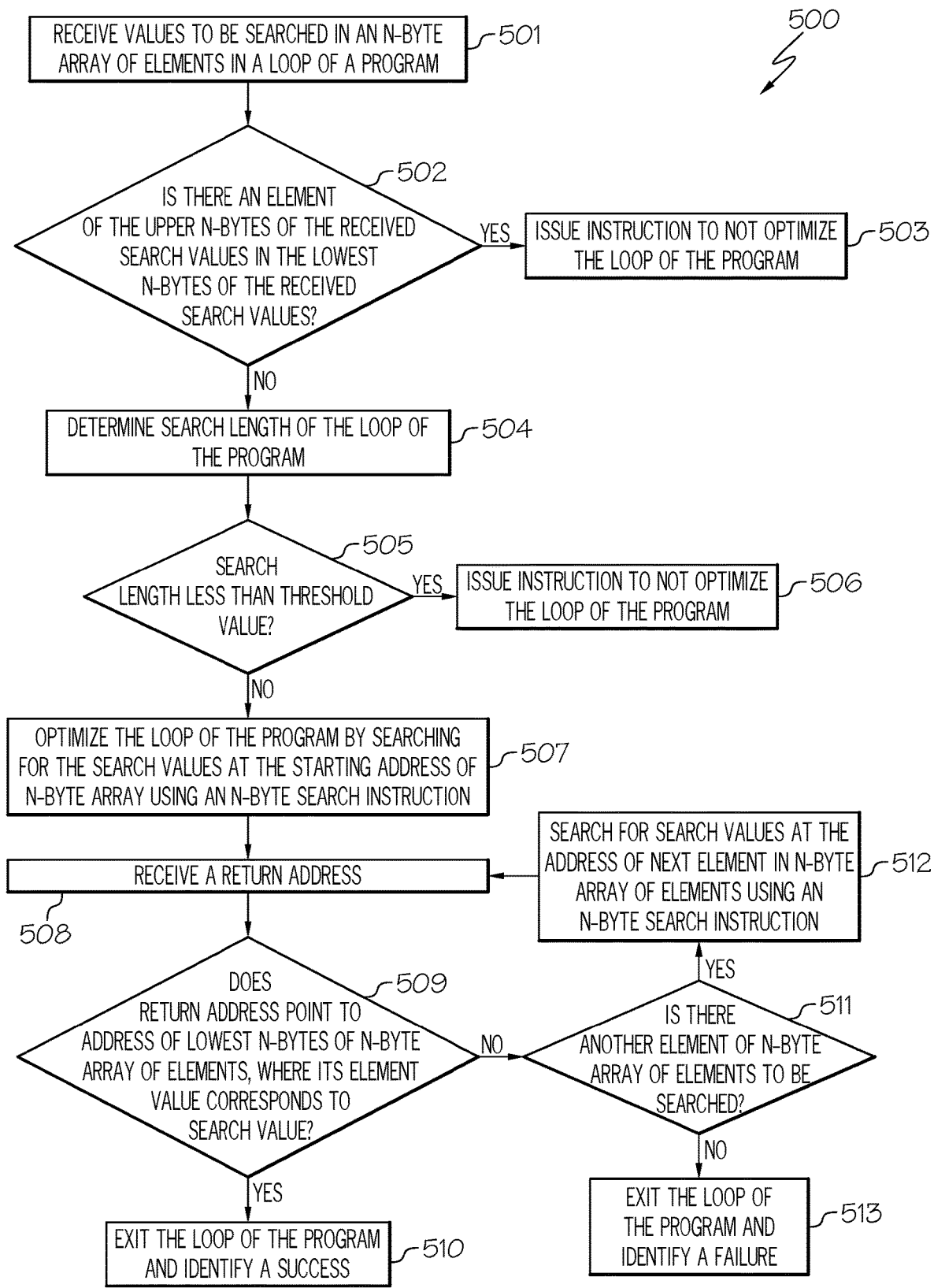
FIG. 5 is a flowchart of a method for effectively searching for values in a multi-byte array of elements using an n-byte search instruction in accordance with an embodiment of the present disclosure.
Figure 6:
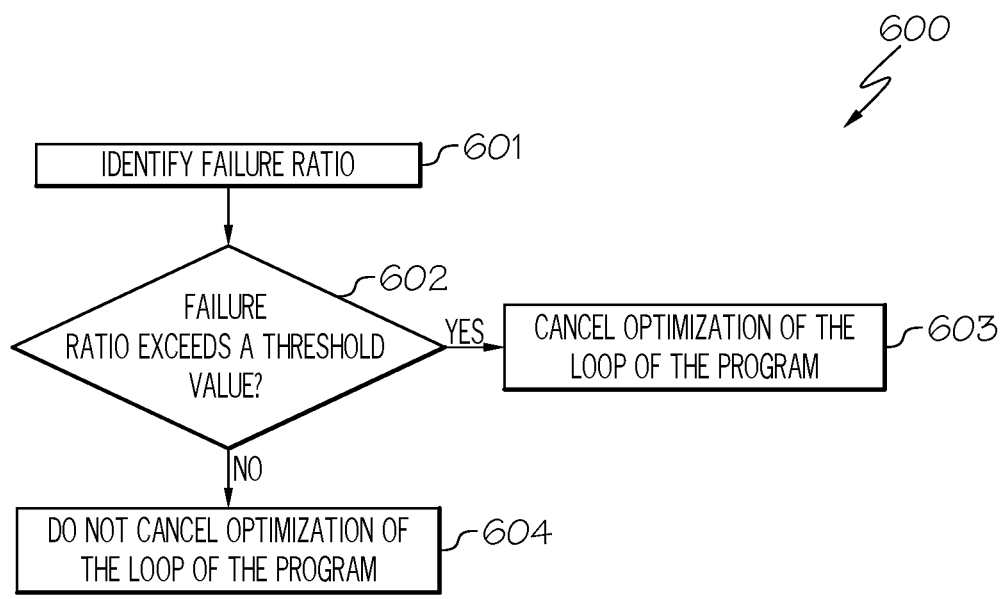
FIG. 6 is a flowchart of a method for utilizing the failure ratio to determine whether or not optimization is to be cancelled in accordance with an embodiment of the present disclosure.

The embodiments of the present disclosure provide a means for utilizing an n-byte search instruction, such as a single-byte search instruction, for performing a search, including a search for multiple values, in a multi-byte array of elements or values, such as in a loop of a program, as discussed below in connection with FIGS. 5 and 6. FIG. 5 is a flowchart of a method for effectively searching for values in a multi-byte array of elements using an n-byte search instruction. FIG. 6 is a flowchart of a method for utilizing the failure ratio to determine whether or not optimization is to be cancelled.

As stated above, FIG. 5 is a flowchart of a method 500 for effectively searching for values in a multi-byte array of elements using an n-byte search instruction (where the element size is n-byte for the search instruction) in accordance with an embodiment of the present disclosure.

Referring to FIG. 5, in conjunction with FIGS. 1-2, 3A-3B and 4, in operation 501, search value analyzer 201 of search system 104 receives multiple values to be searched ("search values") in the N-byte array of elements in a loop of a program. In one embodiment, such values to be searched are provided by an expert, such as a user of search system 104. In one embodiment, the search values are constant values at compile time.

In operation 502, search value analyzer 201 of search system 104 determines if there is an element of the upper n-bytes of the received search values in the lowest n-bytes of the received search values.

As discussed above, the lowest n-bytes of the received search values is referred to herein as the "lower n-bytes" or "LOW." The remaining n-bytes of the received search values are referred to herein as the "upper n-bytes" or "HIGH." As a result, search value analyzer 201 determines if there is an element in HIGH that is also an element in LOW.

If there is an element of the received search values in HIGH that is also an element in LOW, then, in operation 503, search value analyzer 201 of search system 104 issues an instruction to not optimize the loop of the program.

As stated above, search value analyzer 201 issues an instruction to not optimize the loop of the program so as to reduce the failure ratio. In situations in which there is an element of the search values in HIGH that is also in LOW, there is a greater chance of a failure (not being able to identify a search value in the N-byte array of elements). As a result, in such situations, optimization of the loop of the program may not be performed in order to reduce the failure rate.

If, however, there is not an element of the received search values in HIGH that is also an element in LOW, then, in operation 504, loop analyzer 202 of search system 104 determines the search length of a loop of a computer program (also simply referred to as a "program").

As discussed above, a loop, as used herein, refers to a sequence of instructions that is continually repeated until a certain condition is reached. In one embodiment, such a loop contains an array of N-byte elements or values, where N corresponds to n*constant, and where n is the element size of the target search instruction. In one embodiment, loop analyzer 202 determines the search length of the loop of the program by determining the search length of the array of N-byte elements or values in the loop of the program. In one embodiment, loop analyzer 202 determines the search length of the array of N-byte elements or values in the loop of the program by utilizing a value profiling technique, which collects runtime statistics of the search length which is used to obtain the search length (e.g., average search length) at runtime.

In one embodiment, loop analyzer 202 obtains the search length of the loop of the program by identifying the array length, such as via the array.length function.

In one embodiment, the search length of the array of N-byte elements is determined by loop analyzer 202 by identifying the number of elements in the array. In one embodiment, loop analyzer 202 utilizes the size of operator to determine the number of elements in the array.

In operation 505, loop analyzer 202 of search system 104 determines if the search length of the loop of the program is less than a threshold value, which may be user-designated.

If the search length of the loop of the program is less than the threshold value, then, in operation 506, loop analyzer 202 of search system 104 issues an instruction to not optimize the loop of the program. As previously discussed, by performing such an analysis, loop analyzer 202 may decide to not optimize the loop of the program in order to reduce the failure rate. In situations in which the search length of the loop of the program is less than the threshold value, there is a greater chance of a failure (not being able to identify a search value in the N-byte array of elements). As a result, in such situations, optimization of the loop of the program may not be performed in order to reduce the failure rate.

If, however, the search length of the loop of the program is not less than the threshold value, then, in operation 507, optimizing engine 203 of search system 104 optimizes the loop of the program.

As stated above, in one embodiment, optimizing engine 203 optimizes the loop of the program by searching for the search values (values received that are to be searched in the N-byte array of elements) at the starting address of the N-byte array using an n-byte search instruction, including a single-byte search instruction, such as the SRST instruction or the TRT instruction.

In one embodiment, a computer architecture may implement either a little endian system or a big endian system. Endianness, as used herein, refers to the order or sequence of bytes of a word of digital data in computer memory. Endianness is primarily expressed as big endian (BE) or little endian (LE). A big endian system stores the most significant byte(s) of a word at the smallest memory address and the least significant byte(s) at the largest memory address as shown in FIG. 3A. A little endian system, in contrast, stores the least-significant byte(s) at the smallest memory address as shown in FIG. 3B.

As shown in FIG. 3A, in the big endian format 300, the least-significant bytes 301 (lowest n-bytes of the N-byte array of elements) are stored at the largest memory address. The lowest n-bytes of the N-byte array of elements are referred to herein as the "lower n-bytes 301." The remaining n-bytes of the N-byte array of elements are referred to herein as the "upper n-bytes 302" as shown in FIG. 3A.

In contrast, as shown in FIG. 3B, in the little endian format 303, the least-significant bytes 304 (lowest n-bytes of the N-byte array of elements) are stored at the smallest memory address. The lowest n-bytes of the N-byte array of elements are referred to herein as the "lower n-bytes 304." The remaining n-bytes of the N-byte array of elements are referred to herein as the "upper n-bytes 305" as shown in FIG. 3B.

As discussed above, in one embodiment, the loop of the program is optimized by searching the received search values (values to be searched in the N-byte array of elements) in the N-byte array of elements using an n-byte search instruction (e.g., single-byte search instruction, such as the SRST instruction or the TRT instruction). For example, suppose that D1(B1) and D1(B2) are the addresses of the values to be searched in the N-byte array of elements. As a result, the format of a TRT instruction may look like:

TRT D1 (B1, B2), D2 (B3), where D1(B1, B2) are the addresses of the values to be searched, and D2(B3) is the address of the N-byte array of elements.

In operation 508, optimizing engine 203 of search system 104 receives a return address upon searching for the search values (values received that are to be searched in the N-byte array of elements) in the N-byte array of elements.

In operation 509, optimizing engine 203 of search system 104 determines if the return address points to the address in the lowest n-bytes (e.g., lower n-bytes 301, 304) of the N-byte array of elements, where the element of the address corresponds to a search value (one of the values received that are to be searched in the N-byte array of elements).

If the return address points to the address of the lowest n-bytes (e.g., lower n-bytes 301, 304) of the N-byte array of elements, where the element of the address corresponds to a search value, then, in operation 510, optimizing engine 203 of search system 104 exits the loop of the program and quantifies such an identification as a "success." "Success," as used herein, refers to the ability of optimizing engine 203 to identify the address of the element found (element of the address corresponds to a search value) in the N-byte array of elements. Hence, a "success" results in identifying a search value in the N-byte array of elements.

If, however, the return address does not point to an address of the lowest n-bytes (e.g., lower n-bytes 301, 304) of the N-byte array of elements, where the element of the address corresponds to a search value, then, in operation 511, optimizing engine 203 of search system 104 determines if there is another element in the N-byte array of elements to be searched.

If there is another element in the N-byte array of elements to be searched, then, in operation 512, optimizing engine 203 of search system 104 searches for the search values at the address of the next element in the N-byte array of elements using the n-byte search instruction. Upon searching for the search values at the address of the next element in the N-byte array of elements using the n-byte search instruction, a return address is received by optimizing engine 203 of search system 104 in operation 508.

If, however, there is not another element in the N-byte array of elements to be searched (i.e., the return address points to the end of the N-byte array of elements), then, in operation 513, optimizing engine 203 of search system 104 exits the loop of the program and quantifies such an identification as a "failure." "Failure," as used herein, refers to optimizing engine 203 not being able to identify a search value in the N-byte array of elements.

In this manner, an n-byte search instruction, such as a single-byte search instruction, may be utilized to search for multiple values in a multi-byte array of elements.

As discussed above, an example pseudocode for implementing the functionality of optimizing engine 203 is shown below.

SADDRESS=beginning of array A
while (true) {

RET=search values in LOW from SADDRESS by
  using the instruction S
if (RET==End of array A) break; // cannot find
if (RET points to lower && element of RET is one of
    V) {
  RET=beginning of the element address
  break; // found
}
SADDRESS=address of the next element
}

Referring to the above pseudocode, array A refers to the N-byte array of elements, where N corresponds to n*constant, and where n is the element size of the target search instruction. S corresponds to the n-byte search instruction, such as a single-byte search instruction, discussed above. Furthermore, V corresponds to the search values, which are constant values at compile time.

In another example, suppose the following loop of the program is to be optimized.
  for (i=0; i<A.length; i++) // A is a 2-byte array
    if (A[i]==0x000A||A[i]==0x000D) break;
  where V (set of values to be searched in N-byte array of elements)={0x000A, 0x000D}, LOW (lowest n-bytes of V)={0x0A, 0x0D}, HIGH (other n-bytes of V)={0x00}, and (LOW n HIGH) is empty.

An example pseudocode for implementing the functionality of optimizing engine 203 using the single-byte search instruction of the TRT instruction to perform a single-byte search in a multi-value array is shown below. In one embodiment, such code is generated for the loop discussed above, such as in a compiler, for the big endian format.
  SADDRESS=beginning of array A
  while (true) {
    RET=search {0x0A, 0x0D} from SADDRESS by TRT
    if (RET==End of array A) break; // fail
    RET --;
    if ((RET & 1)==0) {
      if (load2Byte(RET)==0x000A or 0x000D))
        break; // found
      SADDRESS=RET+2;
    } else {
      SADDRESS=RET+3;
    }
  }
  i=(RET−beginning of array A)/2;

In one embodiment, a further example of pseudocode for implementing the functionality of optimizing engine 203 using the single-byte search instruction of the TRT instruction to perform a single-byte search in a multi-value array is shown below. In one embodiment, such code is generated for the loop discussed above, such as in a compiler, for the little endian format.
  if (RET==End of array A) break; // fail
  if ((RET & 1)==0) {
    if (load2Byte(RET)==0x000A or 0x000D))
      break; // found
    SADDRESS=RET+2;
  } else {
    SADDRESS=RET+1;
  }

As discussed above, upon identifying the result of the search as being a "success" or a "failure," failure engine 204 of search system 104 determines whether or not optimization is to be cancelled as discussed below in connection with FIG. 6.

FIG. 6 is a flowchart of a method 600 for utilizing the failure ratio to determine whether or not optimization is to be cancelled in accordance with an embodiment of the present disclosure.

Referring to FIG. 6, in conjunction with FIGS. 1-2, 3A-3B and 4-5, in operation 601, failure engine 204 of search system 104 identifies a "failure ratio."

As stated above, in one embodiment, the failure ratio corresponds to the ratio of failures to successes. In one embodiment, failure engine 204 computes the failure ratio as corresponding to the equation of: (failures)/(failures+successes). In one embodiment, after each search is performed, the number of failures or successes is updated to reflect whether the previous search was deemed to be a failure or a success.

In operation 602, failure engine 204 of search system 104 determines if the failure ratio exceeds a threshold value, which may be user-designated.

If the failure ratio is greater than the threshold value, then, in operation 603, failure engine 204 of search system 104 cancels the optimization of the loop of the program since the loop of the program is not being effectively optimized.

As discussed above, in one embodiment, failure engine 204 cancels the optimization of the loop of the program by code patching or recompilation. "Code patching," as used herein, refers to removing the code discussed above that was utilized to optimize the loop of the program. In this manner, the loop of the program will not be optimized.

"Recompilation," as used herein, refers to the action or process of recompiling the set of machine instructions again without the code discussed above that was utilized to optimize the loop of the program. In this manner, the loop of the program will not be optimized upon recompiling the program.

If, however, the failure ratio is not greater than the threshold value, then, in operation 604, failure engine 204 of search system 104 does not cancel the optimization of the loop of the program An example pseudocode for computing successes and failures by failure engine 204 is shown below.
  SADDRESS=beginning of array A
  while (true) {
    RET=search values in LOW from SADDRESS by
      using the instruction S
    if (RET==End of array A) break; // cannot find
    if (RET points to lower && element of RET is one of
        V) {
      RET=beginning of the element address
      successes++;
      break; // found
    }
    failures++;
    SADDRESS=address of the next element
  }

As a result of the foregoing, embodiments of the present disclosure provide a means for enabling an n-byte search instruction, such as a single-byte search instruction, to search for values in a multi-byte array of elements.

Furthermore, the principles of the present disclosure improve the technology or technical field involving single-byte search instructions. As discussed above, many computer architectures utilize a single-byte search instruction to perform searches for an element or value in a single-byte array of elements or values. A "byte" is a unit of data that is eight binary digits long. A byte is the unit most computers use to represent a character, such as a letter, number or typographic symbol. For example, such a byte may represent an element or value to be searched in an array of elements or values. An "instruction" is an order given to a computer processor by a computer program. A "single-byte search instruction" refers to an instruction to perform a search in each byte from a given start address in a very fast manner. Currently, such single-byte search instructions are not able to be utilized to search for elements or values in a multi-byte array of elements or values. Instead, a slower search is performed to search for elements or values in a multi-byte array of elements or values, such as via the Single Instruction/Multiple Data (SIMD) instruction, which refers to a computing method that enables processing of multiple data with a single instruction. SIMD instructions give data-level parallelism on a unit (vector of data). A single instruction is executed in parallel on multiple data points as opposed to executing multiple instructions. This improves the performance of the application. Currently, SIMD instructions may be used to search for elements or values in an array of 2, 4 or 8-byte elements or values. However, not all computer architectures support SIMD instructions, and therefore, are not able to search such an array of byte elements or values using the SIMD instruction. Furthermore, SIMD instructions are not able to search for elements or values in an array of a certain number of byte elements, such as an array of 3-byte elements. As a result, a SIMD instruction may not be able to be utilized to search for elements or values in a particular multi-byte array of elements or values. Additionally, if there are multiple values (search values) to be searched in a multi-byte array of byte elements, then using SIMD instructions may not be effective in performing such a search. For example, if value #1 and value #2 are to be searched in the multi-byte array of elements using a SIMD instruction, then separate searches using separate SIMD instructions need to be performed in which value #1 is first searched followed by searching for value #2 in the multi-byte array of elements. Hence, using instructions, such as SIMD instructions, to search for elements or values in a multi-byte array of elements or values may not be an effective approach. If, however, a single-byte search instruction could be utilized to search for elements or values in a multi-byte array of elements or values, then the speed of the search process could be improved. Furthermore, by using a single-byte search instruction, elements or values may be searched in arrays with a different element size than currently supported by the SIMD instruction (e.g., SIMD instructions may be used to search for elements or values in an array of 2, 4 or 8-byte elements or values), such as an array of 3-byte elements. Additionally, by using a single-byte search instruction, separate searches may not need to be performed in searching for values in a multi-byte array of elements or values. Unfortunately, there is not currently an effective means for utilizing a single-byte search instruction for performing a search, including a search for multiple values, in a multi-byte array of elements or values.

Embodiments of the present disclosure improve such technology by receiving multiple values to be searched ("search values") in an N-byte array of elements in a loop of a program, where N corresponds to n*constant, and where n is the element size of the target search instruction. In one embodiment, the search values are constant values at compile time. The loop of the program may then be optimized by searching for search values at the starting address of the N-byte array of elements using the n-byte search instruction. "Optimizing," as used herein, refers to being able to search for elements or values in a multi-byte array of elements or values using an n-byte search instruction, including a single-byte search instruction, such as a Search String (SRST) instruction or a Translate and Test (TRT) instruction. Optimizing involves including in the loop of the program with faster code that performs operations directed to searching for elements or values in a multi-byte array of elements or values using an n-byte search instruction. Upon performing such a search for search values, a return address is received. If the return address points to an address in the lowest n-bytes of the N-byte array of elements and its element value corresponds to a search value, then the search is deemed to be a "successful search." If, however, the return address does not point to an address in the lowest n-bytes of the N-byte array of elements where its element value corresponds to a search value, then a subsequent search for the search values at the address of the next element of the N-byte array of elements is performed if there are more elements to be searched in the N-byte array of elements. If, however, there are no more additional elements of the N-byte array of elements to be searched (i.e., the return address points to an address at the end of the N-byte array of elements), then the search is deemed to be unsuccessful or a failure. In this manner, an n-byte search instruction, including a single-byte search instruction, may be utilized to search for multiple values in a multi-byte array of elements. Furthermore, in this manner, there is an improvement in the technical field involving single-byte search instructions.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for effectively searching for values in a multi-byte array of elements using an n-byte search instruction, the method comprising:

receiving values to be searched in an N-byte array of elements in a loop of a program, wherein the N corresponds to n*constant, wherein the n is an element size of a target search instruction;

optimizing the loop of the program by searching for the received values at a starting address of the N-byte array of elements using the n-byte search instruction;

receiving a return address in response to searching for the received values at the starting address of the N-byte array of elements using the n-byte search instruction; and identifying a search value of the received values in the N-byte array of elements in response to the return address pointing to an address found in a lowest n-bytes of the N-byte array of elements and an element of the address corresponds to the search value.

2. The method as recited in claim 1 further comprising:
exiting the loop of the program in response to identifying the search value of the received values in the N-byte array of elements.

3. The method as recited in claim 1 further comprising:
searching for the received values at a next element in the N-byte array of elements using the n-byte search instruction.

4. The method as recited in claim 1 further comprising:
issuing an instruction to not optimize the loop of the program in response to a search length of the loop of the program being less than a threshold value.

5. The method as recited in claim 1 further comprising:
identifying a success in response to identifying a received value to be searched in the N-byte array of elements;
identifying a failure in response to not identifying a received value to be searched in the N-byte array of elements;
identifying a failure ratio based on a number of identified successes and failures; and
cancelling the optimizing of the loop of the program in response to the failure ratio being greater than a threshold value.

6. The method as recited in claim 5, wherein the optimizing of the loop of the program is cancelled by code patching or recompilation.

7. The method as recited in claim 1, wherein the n-byte search instruction comprises a single-byte search instruction, wherein the single-byte search instruction is selected from the group consisting of a Search String (SRST) instruction and a Translate and Test (TRT) instruction.

8. A computer program product for effectively searching for values in a multi-byte array of elements using an n-byte search instruction, the computer program product comprising one or more computer readable storage mediums having program code embodied therewith, the program code comprising programming instructions for:
receiving values to be searched in an N-byte array of elements in a loop of a program, wherein the N corresponds to n*constant, wherein the n is an element size of a target search instruction;
optimizing the loop of the program by searching for the received values at a starting address of the N-byte array of elements using the n-byte search instruction;
receiving a return address in response to searching for the received values at the starting address of the N-byte array of elements using the n-byte search instruction; and
identifying a search value of the received values in the N-byte array of elements in response to the return address pointing to an address found in a lowest n-bytes of the N-byte array of elements and an element of the address corresponds to the search value.

9. The computer program product as recited in claim 8, wherein the program code further comprises the programming instructions for:
exiting the loop of the program in response to identifying the search value of the received values in the N-byte array of elements.

10. The computer program product as recited in claim 8, wherein the program code further comprises the programming instructions for:
searching for the received values at a next element in the N-byte array of elements using the n-byte search instruction.

11. The computer program product as recited in claim 8, wherein the program code further comprises the programming instructions for:
issuing an instruction to not optimize the loop of the program in response to a search length of the loop of the program being less than a threshold value.

12. The computer program product as recited in claim 8, wherein the program code further comprises the programming instructions for:
identifying a success in response to identifying a received value to be searched in the N-byte array of elements;
identifying a failure in response to not identifying a received value to be searched in the N-byte array of elements;
identifying a failure ratio based on a number of identified successes and failures; and
cancelling the optimizing of the loop of the program in response to the failure ratio being greater than a threshold value.

13. The computer program product as recited in claim 12, wherein the optimizing of the loop of the program is cancelled by code patching or recompilation.

14. The computer program product as recited in claim 8, wherein the n-byte search instruction comprises a single-byte search instruction, wherein the single-byte search instruction is selected from the group consisting of a Search String (SRST) instruction and a Translate and Test (TRT) instruction.

15. A system, comprising:
a memory for storing a computer program for effectively searching for values in a multi-byte array of elements using an n-byte search instruction; and
a processor connected to the memory, wherein the processor is configured to execute program instructions of the computer program comprising:
receiving values to be searched in an N-byte array of elements in a loop of a program, wherein the N corresponds to n*constant, wherein the n is an element size of a target search instruction;
optimizing the loop of the program by searching for the received values at a starting address of the N-byte array of elements using the n-byte search instruction;
receiving a return address in response to searching for the received values at the starting address of the N-byte array of elements using the n-byte search instruction; and
identifying a search value of the received values in the N-byte array of elements in response to the return address pointing to an address found in a lowest n-bytes of the N-byte array of elements and an element of the address corresponds to the search value.

16. The system as recited in claim 15, wherein the program instructions of the computer program further comprise:
exiting the loop of the program in response to identifying the search value of the received values in the N-byte array of elements.

17. The system as recited in claim 15, wherein the program instructions of the computer program further comprise:
searching for the received values at a next element in the N-byte array of elements using the n-byte search instruction.

18. The system as recited in claim 15, wherein the program instructions of the computer program further comprise:

issuing an instruction to not optimize the loop of the program in response to a search length of the loop of the program being less than a threshold value.

19. The system as recited in claim 15, wherein the program instructions of the computer program further comprise:

identifying a success in response to identifying a received value to be searched in the N-byte array of elements;

identifying a failure in response to not identifying a received value to be searched in the N-byte array of elements;

identifying a failure ratio based on a number of identified successes and failures; and cancelling the optimizing of the loop of the program in response to the failure ratio being greater than a threshold value.

20. The system as recited in claim 19, wherein the optimizing of the loop of the program is cancelled by code patching or recompilation.

* * * * *